United States Patent Office 3,549,242
Patented Dec. 22, 1970

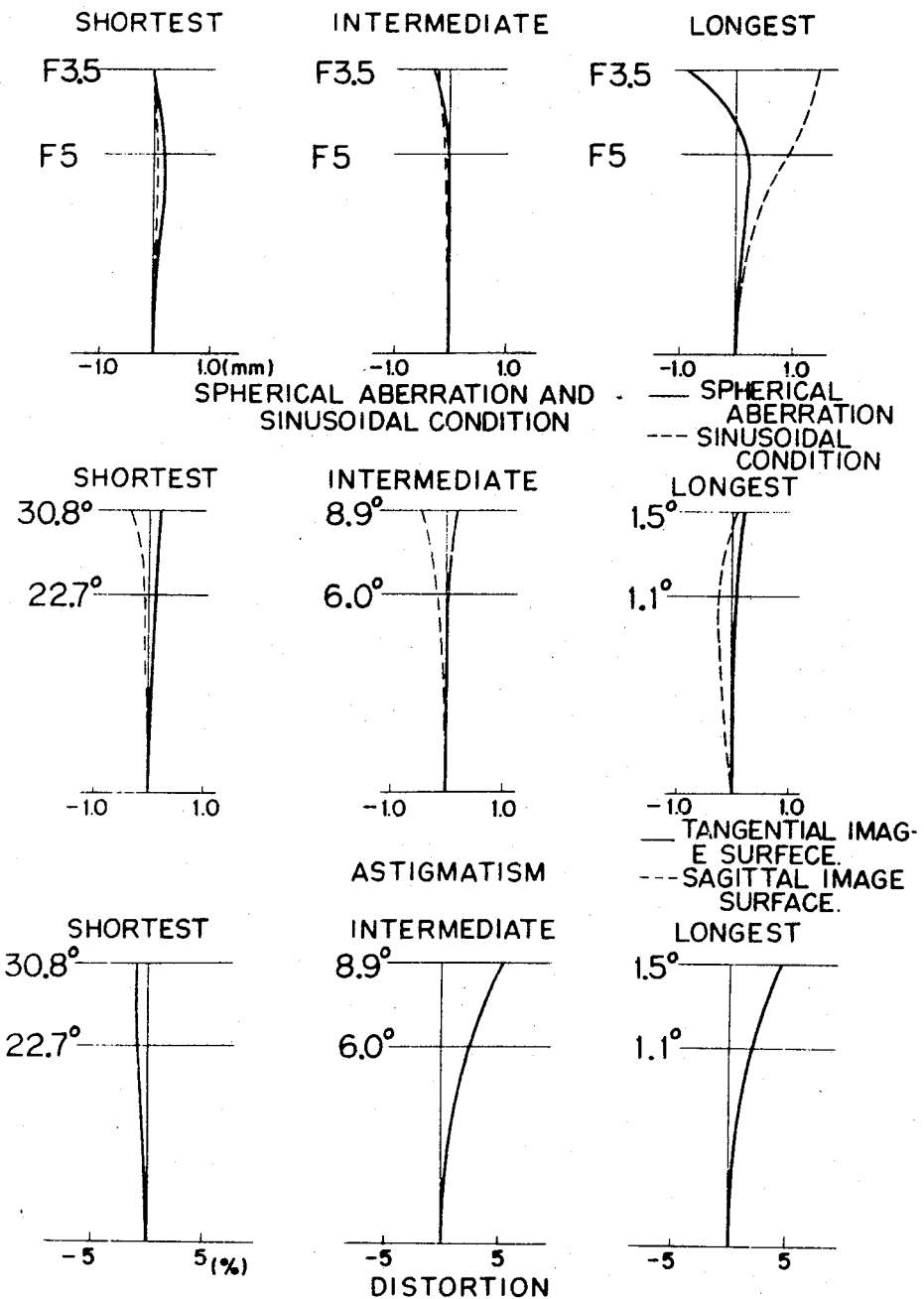

3,549,242
ZOOMING LENS OF EXTREMELY HIGH ZOOMING RATIO
Takashi Higuchi, Yokohama-shi, and Soichi Nakamura, Tokyo, Japan, assignors to Nippon Kogaku K.K., Tokyo, Japan, a corporation of Japan
Filed Oct. 18, 1967, Ser. No. 676,355
Claims priority, application Japan, Oct. 27, 1966, 41/70,456
Int. Cl. G02b 15/14
U.S. Cl. 350—184          2 Claims

ABSTRACT OF THE DISCLOSURE

A variable focal length lens system of extremely high zooming ratio is provided comprising a first convergent member, a divergent member and a second convergent member in which the first and second convergent members are moved in unison while the divergent member is moved in an opposite direction to carry out the zooming operation.

---

Figure 1:
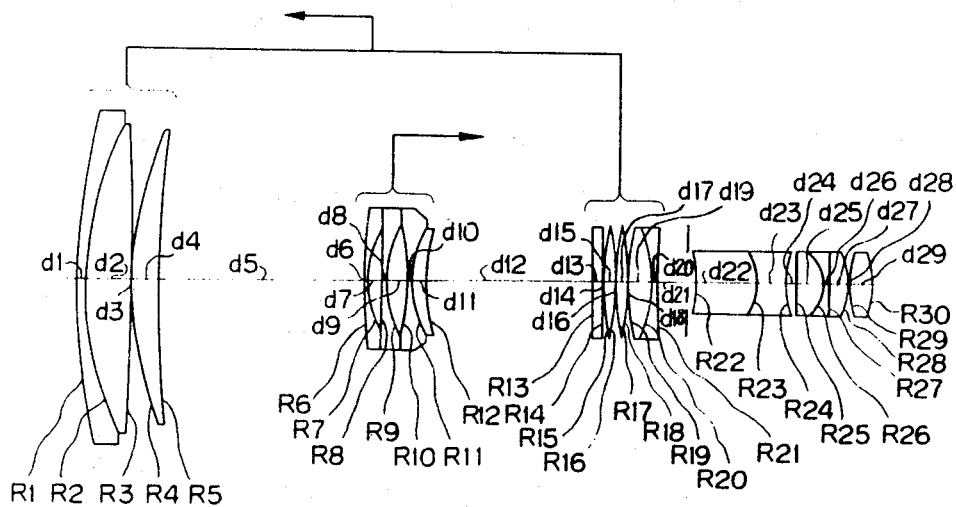

The present invention relates to a variable focal length lens having a high zooming ratio, ranging from 10 to 30, which conventional zooming systems cannot attain.

The zooming group of the present invention comprises three members, namely, a first convergent member, a divergent member, and a second convergent member. The zooming operation is attained by moving the first convergent and the second convergent members in unison, and at the same time the divergent member is moved in the opposite direction. The conditions for the basic factors (such as focal length and intervals between lenses) are completely different from the factors according to the zooming systems of the prior art.

Other advantages and features of the present invention will become more apparent from the following description of an illustrative embodiment in conjunction with the accompanying drawings, wherein FIG. 1 is a cross sectional view of a zooming lens according to the present invention; and FIG. 2 shows the various aberration curves of the lens illustrated in FIG. 1.

According to the zooming system of the present invention, in order to attain the maximum zooming effect, it is necessary to move the first and second convergent members in the direction opposite to the movement of the concave lens group, and at the same time the amount of the movements of the respective groups must be made as large as possible.

The zooming ratio of the conventional zooming systems is as much as ten, because the amount of the movement of the respective groups of lenses is restricted within the range defined by the formulae of conditions.

In accordance with the present invention, it is possible to obtain the zooming lens having more than 10 to 30 zooming ratio by combining the conditions outside of the range of the formulae of conditions of the conventional zooming systems.

In other words, when the focal length of the first convex lens group is represented by $f_1$, the focal length of the divergent members is represented by $f_2$, and the focal length of the second convergent member is represented by $f_3$; the focal length of the zooming group at the minimum focal length is represented by $fvw$, and the composite focal length of the whole system is represented by $fw$, and the distance between the first convergent member and the divergent member and the distance between the divergent and the second convergent members are respectively represented by $D_1$ and $D_2$, the following relations shall be satisfied:

$$5.4|f_2| < f_1 < 9.5|f_2| \tag{1}$$

$$2.9 f_3 < D_1 + D_2 < 5.8 f_3 \tag{2}$$

$$0.35 < fvw/fw < 1.5 \tag{3}$$

By satisfying the Formulae 1 and 2, it is possible to obtain the most compact combination of $f_1$, $f_2$, $f_3$, $D_1+D_2$ which can attain the zooming effect most effectively.

The following is an explanation of the significance of Formulae 1, 2, and 3 in such a manner that the inventive zooming system cannot be attained outside the range of the above given formulae.

In Formulae 1 and 2, when $5.4|f_2|$ is larger than $f_1$, and $2.9|f_3|$ is larger than $D_1+D_2$, the amount of movement of the first and second convergent members and the movement of the divergent member, respectively, are not sufficient, and it is impossible to obtain a zooming effect of more than ten times. On the other hand, in case $9.5|f_2|$ is smaller than $f_1$ and $5.8|f_3|$ is smaller than $D_1+D_2$, the amount of movement of the divergent member is increased too much, so that although the zooming ratio is increased, the whole length of the lens system is greatly increased, and it is impossible to attain the effective zooming ratio; and this is contrary to the object of the invention.

Therefore, $f_1$ and $D_1+D_2$ must be within the scope of Formulae 1 and 2, and Formula 3 is an essential condition showing the relation between the zooming system and relay lens for obtaining a compact and extremely high zooming system. When 1.5 is smaller than $fvw/fw$, it is very advantageous to correct various kinds of aberrations, but the zooming system becomes too large, and it is not practical. When $fvw/fw$ is smaller than 0.35, difficult problems are brought about in carrying out the correction of aberrations, and extreme precision is required of the cam providing the zooming operation, and it does not become practical.

Thus, when the three conditions represented by Formulae 1, 2, and 3 are satisfied, it is possible to obtain a zooming lens of high efficiency, all aberrations of which are well corrected throughout the whole range, and the obtained zooming system has an extremely high zooming ratio, and is very compact.

The following is an embodiment of the present invention. In the following embodiment, $R_1$, $R_2$ ... $R_{30}$ are the radii of curvature of the respective lenses, and $d_1$, $d_2$ ... $d_{29}$ are the central thickness of the respective lenses and air-intervals between respective lenses, and $n_1$, $n_2$ ... $n_{18}$ are the refractive indices for the $d$ line of the respective raw material glasses, and $v_1, v_2 \ldots v_{18}$ show Abbe's numbers of said raw material glasses.

EMBODIMENT $f = 13 \sim 286$ œœ F/3.5    Zooming ratio: 22    Image angle (61.6°~3.0°)

| | | | | | |
|---|---|---|---|---|---|
| | $R_1 = 210.447$ | $d_1 = 2.2$ | | $n_1 = 1.78472$ | $v_1 = 25.7$ |
| | $R_2 = 90.0$ | $d_2 = 12.0$ | | $n_2 = 1.61405$ | $v_2 = 55.1$ |
| $f_1 = 154$ | $R_3 = -937.46$ | $d_3 = 0.1$ | | | |
| | $R_4 = 98.582$ | $d_4 = 7.3$ | | $n_3 = 1.51835$ | $v_3 = 60.3$ |
| | $R_5 = 425.3202$ | | | | |
| | | $d_5 = 0.41 \sim 57.7075 \sim 99.3295$ | | | |
| | $R_6 = 246.0$ | $d_6 = 0.85$ | | $n_4 = 1.64006$ | $v_4 = 60.0$ |
| | $R_7 = 34.4$ | $d_7 = 3.4$ | | | |
| | $R_8 = 210.2$ | $d_8 = 0.85$ | | $n_5 = 1.64006$ | $v_5 = 60.0$ |
| $f_2 = -21.281$ | $R_9 = 28.927$ | $d_9 = 6.5$ | | | |
| | $R_{10} = -82.48$ | $d_{10} = 0.75$ | | $n_6 = 1.51728$ | $v_6 = 69.6$ |
| | $R_{11} = 25.0$ | $d_{11} = 4.35$ | | $n_7 = 1.78472$ | $v_7 = 25.7$ |
| | $R_{12} = 65.1988$ | | | | |
| | | $d_{12} = 102.1968 \sim 44.8968 \sim 3.2768$ | | | |
| | $R_{13} = 346.6$ | $d_{13} = 3.0$ | | $n_8 = 1.61840$ | $v_8 = 44.2$ |
| | $R_{14} = 557.6$ | $d_{14} = 0.1$ | | | |
| | $R_{15} = 86.894$ | $d_{15} = 3.0$ | | $n_9 = 1.62606$ | $v_9 = 39.1$ |
| | $R_{16} = -144.0$ | $d_{16} = 0.1$ | | | |
| $f_3 = 30.0$ | $R_{17} = 86.894$ | $d_{17} = 3.0$ | | $n_{10} = 1.62606$ | $v_{10} = 39.1$ |
| | $R_{18} = -144.0$ | $d_{18} = 0.1$ | | | |
| | $R_{19} = 69.1$ | $d_{19} = 7.5$ | | $n_{11} = 1.73601$ | $v_{11} = 51.0$ |
| | $R_{20} = -26.167$ | $d_{20} = 1.0$ | | $n_{12} = 1.78472$ | $v_{12} = 25.7$ |
| | $R_{21} = 1008.72$ | | | | |
| | | $d_{21} = 3.6837 \sim 11.6837 \sim 26.6837$ | | | |
| | $R_{22} = -40.27$ | $d_{22} = 17.0$ | | $n_{13} = 1.72342$ | $v_{13} = 38.0$ |
| | $R_{23} = -11.8$ | $d_{23} = 7.5$ | | $n_{14} = 1.62045$ | $v_{14} = 38.0$ |
| | $R_{24} = 19.2$ | $d_{24} = 2.4$ | | | |
| | $R_{25} = \infty$ | $d_{25} = 7.45$ | | $n_{15} = 1.44628$ | $v_{15} = 67.2$ |
| | $R_{26} = -9.864$ | $d_{26} = 1.45$ | | $n_{16} = 1.57250$ | $v_{16} = 57.5$ |
| | $R_{27} = \infty$ | $d_{27} = 5.8$ | | $n_{17} = 1.46450$ | $v_{17} = 65.8$ |
| | $R_{28} = -19.704$ | $d_{28} = 0.05$ | | | |
| | $R_{29} = 59.9$ | $d_{29} = 5.8$ | | $n_{18} = 1.51118$ | $v_{18} = 50.9$ |
| | $R_{30} = -77.40$ | | | | |

In the zooming system of this type, when the above mentioned conditions should be selected, a compact zooming lens system of high zooming ratio and high efficiency can be obtained. The zooming system of the present invention can be used not only for miniature type movie camera, but it can also be used for television cameras and still cameras.

What is claimed is:

1. A variable focal length lens system of extremely high zooming ratio consisting in seriatim of a front zooming group, and a stationary rear group, said front zooming group comprising:

a first convergent member composed of a positive biconvex doublet of which the cemented surface is convex toward the object and a positive meniscus single lens element convex toward the object, a divergent member composed of two air spaced negative meniscus single lens elements convex toward the object and a negative biconcave doublet of which the cemented surface is convex toward the object, and a second convergent member composed of three air spaced biconvex lens elements and a positive biconvex doublet of which the cemented surface is concave toward the object, the zooming operation being performed by moving said first and second convergent members in unison and at the same time moving the divergent member between said first and second convergent members in the opposite direction, said stationary rear group comprising a negative biconcave doublet of which the cemented surface is convex toward the image, a positive plano-convex triplet in which plano-convex, plano-concave and plano-convex lens elements are cemented, and a biconvex single lens element.

2. Variable focal length lens system according to claim 1, in which the system has the numerical data substantially as set forth in the following table:

EMBODIMENT $f = 13 \sim 286_{mm}$ F/3.5    Zooming ratio: 22    Image angle (61.6°~3.0°)

| | | | | | |
|---|---|---|---|---|---|
| | $R_1 = 210.447$ | $d_1 = 2.2$ | | $n_1 = 1.78472$ | $v_1 = 25.7$ |
| | $R_2 = 90.0$ | $d_2 = 12.0$ | | $n_2 = 1.61405$ | $v_2 = 55.1$ |
| $1 = 154$ | $R_3 = -937.46$ | $d_3 = 0.1$ | | | |
| | $R_4 = 98.582$ | $d_4 = 7.3$ | | $n_3 = 1.51835$ | $v_3 = 60.3$ |
| | $R_5 = 425.3202$ | | | | |
| | | $d_5 = 0.41 \sim 57.7075 \sim 99.3295$ | | | |
| | $R_6 = 246.0$ | $d_6 = 0.85$ | | $n_4 = 1.64006$ | $v_4 = 60.0$ |
| | $R_7 = 34.4$ | $d_7 = 3.4$ | | | |
| | $R_8 = 210.2$ | $d_8 = 0.85$ | | $n_5 = 1.64006$ | $v_5 = 60.0$ |
| $f_2 = -21.281$ | $R_9 = 28.927$ | $d_9 = 6.5$ | | | |
| | $R_{10} = -82.48$ | $d_{10} = 0.75$ | | $n_6 = 1.51728$ | $v_6 = 69.6$ |
| | $R_{11} = 25.0$ | $d_{11} = 4.35$ | | $n_7 = 1.78472$ | $v_7 = 25.7$ |
| | $R_{12} = 65.1988$ | | | | |
| | | $d_{12} = 102.1968 \sim 44.8968 \sim 3.2768$ | | | |
| | $R_{13} = 346.6$ | $d_{13} = 3.0$ | | $n_8 = 1.61840$ | $v_8 = 44.2$ |
| | $R_{14} = 557.6$ | $d_{14} = 0.1$ | | | |
| | $R_{15} = 86.894$ | $d_{15} = 3.0$ | | $n_9 = 1.62606$ | $_9 = 39.1$ |
| | $R_{16} = -144.0$ | $d_{16} = 0.1$ | | | |
| $f_3 = 30.0$ | $R_{17} = 86.894$ | $d_{17} = 3.0$ | | $n_{10} = 1.62606$ | $_{10} = 39.1$ |
| | $R_{18} = -144.0$ | $d_{18} = 0.1$ | | | |
| | $R_{19} = 69.1$ | $d_{19} = 7.5$ | | $n_{11} = 1.73601$ | $_{11} = 51.0$ |
| | $R_{20} = -26.167$ | $d_{20} = 1.0$ | | $n_{12} = 1.78472$ | $_{12} = 25.7$ |
| | $R_{21} = 1008.72$ | | | | |
| | | $d_{21} = 3.6837 \sim 11.6837 \sim 26.6837$ | | | |
| | $R_{22} = -40.27$ | $d_{22} = 17.0$ | | $n_{13} = 1.72342$ | $_{13} = 38.0$ |
| | $R_{23} = -11.8$ | $d_{23} = 7.5$ | | $n_{14} = 1.62045$ | $_{14} = 38.0$ |
| | $R_{24} = 19.2$ | $d_{24} = 2.4$ | | | |
| | $R_{25} = \infty$ | $d_{25} = 7.45$ | | $n_{15} = 1.44628$ | $_{15} = 67.2$ |
| | $R_{26} = -9.864$ | $d_{26} = 1.45$ | | $n_{16} = 1.57250$ | $_{16} = 57.5$ |
| | $R_{27} = \infty$ | $d_{27} = 5.8$ | | $n_{17} = 1.46450$ | $_{17} = 65.8$ |
| | $R_{28} = -19.704$ | $d_{28} = 0.05$ | | | |
| | $R_{29} = 59.9$ | $d_{29} = 5.8$ | | $n_{18} = 1.51118$ | $v_{18} = 50.9$ |
| | $R_{30} = -77.40$ | | | | | wherein $R_1, R_2 \ldots R_{30}$ are the radii of curvature of the respective lenses, $d_1, d_2 \ldots d_{29}$ are the central thickness of the respective lenses and air spaces between respective lenses, $n_1, n_2 \ldots n_{18}$ are the refractive indices for the d line of the respective raw material glasses, and $v_1, v_2 \ldots v_{18}$ show Abbe numbers of the respective elements.

References Cited

UNITED STATES PATENTS 2,782,684    2/1957    Hopkins _____ 350—184

FOREIGN PATENTS 943,180    12/1963    Great Britain _____ 350—184
1,028,353    5/1966    Great Britain _____ 350—184

JOHN K. CORBIN, Primary Examiner

U.S. Cl. X.R.

350—214